March 27, 1934.  R. BARROS  1,952,902
HELICOIDAL SHOCK ABSORBER
Filed Feb. 25, 1931  2 Sheets-Sheet 1
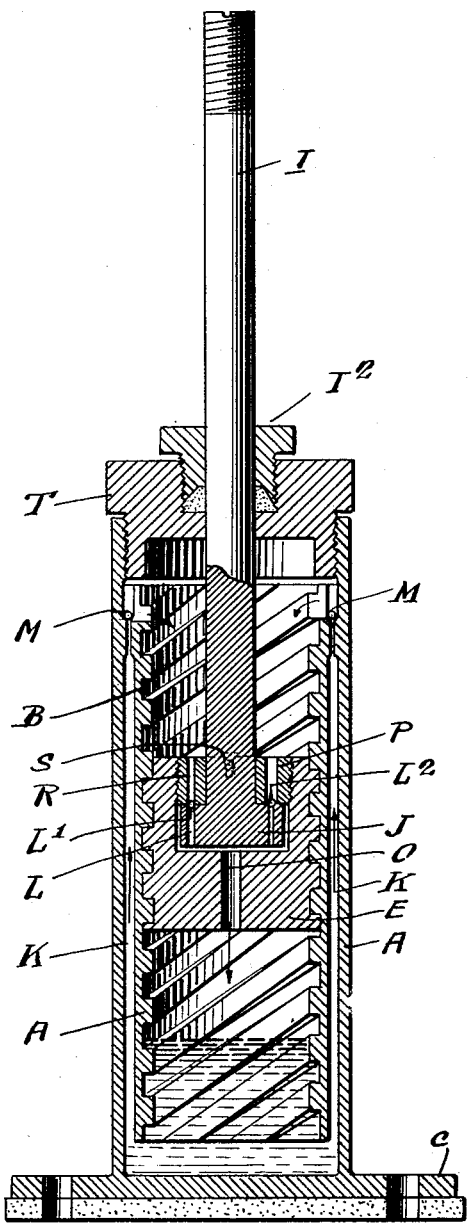
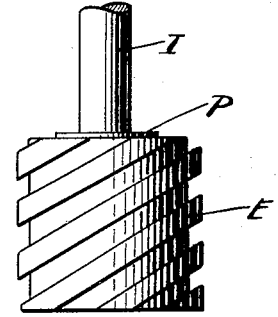
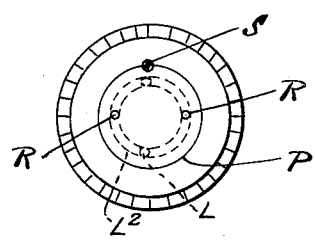
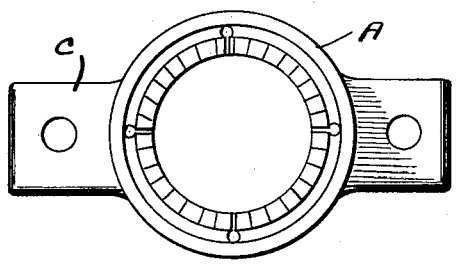
Inventor
Ramon Barros
By His Attorney March 27, 1934.   R. BARROS   1,952,902
HELICOIDAL SHOCK ABSORBER
Filed Feb. 25, 1931   2 Sheets-Sheet 2
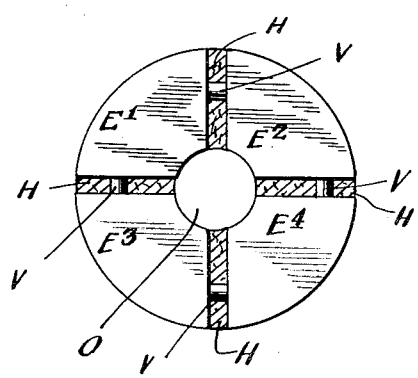
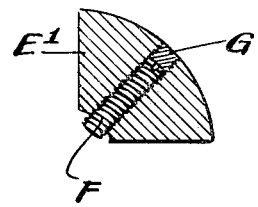
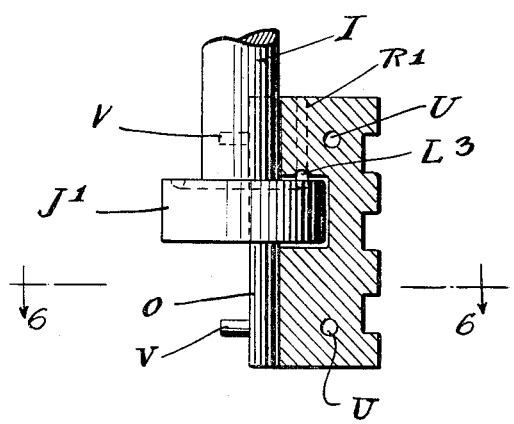
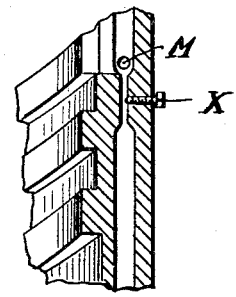
Inventor
Ramon Barros
By his Attorney Patented Mar. 27, 1934

1,952,902

UNITED STATES PATENT OFFICE 1,952,902

HELICOIDAL SHOCK ABSORBER

Ramón Barros, Cordoba, Argentina

Application February 25, 1931, Serial No. 518,085

3 Claims. (Cl. 188—88)

The present invention refers to a novel shock absorber with which it is possible to counteract the violent shocks which all vehicles of mechanical traction inevitably are subjected to, with the consequent wear and tear and in some cases even complete breakdown, as it is a difficult problem to obtain an efficient shock absorber, because both the mechanical and hydraulic types have not given satisfactory results.

This invention is based on mechanical, pneumatic and hydraulic principles, and the shock absorber is also adjustable as to its mechanical resistance to violent shocks from zero point to the infinite, this depending on the degree of pitch given to the thread between 90° to 180°.

The advantages offered by this apparatus will be made evident after its construction has been described.

Reference is made to the accompanying drawings wherein:

Fig. 1 is a vertical section of the apparatus;

Fig. 2 is a plan view of the cylinder without the cover and minus the plunger;

Fig. 3 is a front and plan view of the plunger.

Fig. 4 is a plan view of the four segments which form a modified construction of the plunger;

Fig. 5 is a side view of one of the segments illustrated in Fig. 4;

Fig. 6 is a horizontal cross section of one of the segments illustrated in Fig. 4 taken on the line 6—6 of Fig. 5;

Fig. 7 is a vertical cross section of the walls of the cylinder showing the valve (M) in a modified form of construction.

Within a cylinder (A) provided with helical grooves (B) operates a piston (E) with a helical thread perfectly adaptable to the grooves of the cylinder. This plunger (E) is worked by a stem (I) the lower end of which (J) has the form in section of an inverted T (Fig. 1).

The wall of the cylinder is provided with the channels or spaces (K) for the circulation of oil, with the valves (M) which allow the passage of oil towards the interior of the cylinder, in the direction marked by the arrows, but prevent the oil from flowing in the opposite direction. The plunger is provided with a vertical perforation (O).

The extremity (J) of the stem (I) is provided with two or more perforations (L) vertically disposed, also a circular groove (L') which is in communication with another circular groove (L$^2$) in the threaded sleeve (P) which also is provided with the vertical perforations (R).

This sleeve is screwed on to the plunger (E) provided with helical grooves and is secured in position by means of a set screw (S) Figs. 1 and 3, the piston (E) being able to turn freely in either direction in relation to the stem (I).

The entrance of the cylinder (A) is closed by a cylindrical metallic cover (T) provided with a center perforation to allow the passage of the stem (I) and acting as a guide to same. This cylindrical cover (T) is provided with a stuffing box (T$^2$), in order to prevent leakage from the cylinder and to allow the supply of the necessary lubrication to the stem (I) and to serve as a guide.

The entire apparatus may be fixed to the vehicle axle (not shown) by the base (C) by means of hooks or bolts or if found convenient it may be fixed in position by the cover (T).

The stem (I) should be attached to the "chassis" by means of brackets, and may be of any suitable length.

A modified construction of the apparatus may be obtained whenever found necessary or convenient which consists of the following changes: The plunger (E) may be constructed in four portions or segments (E'), (E$^2$), (E$^3$), (E$^4$) Fig. 4 between which are allowed the spaces (H) to be filled with leather or rubber sheets which would be maintained in position by the pressure of the segments and secured by the studs (V), which may be detachable or otherwise and which engage the perforations (U). This modification would afford the advantage of increasing the pressure of the plunger against the sides of the cylinder wall and making unnecessary the threaded cover (P) and the set screw (S) which in this case would be impracticable. The plunger would thus take the form as indicated by a vertical view of the segment in Fig. 5; which shows the perforations (R') and the circular groove (L$^3$) replacing the perforation (R) and circular groove (L$^2$) shown in Fig. 1.

In order to regulate the working of the automatic valve formed by the perforation (O) and the lower end (J) of the stem (I) a perforation (G) is made in the segment (E') or in the plunger (E), in this perforation a screw (F) Fig. 6, is placed which will serve to graduate the free section and thus graduate the capacity of the passage (O).

In a similar manner and in order to graduate the operation of the valves (M) I provide screws (X) Fig. 7 which are regulated from the exterior of the cylinder, one for each valve.

Once the apparatus is mounted in such a manner that in its normal position the piston occupies the center of the cylinder and supposing that the stem (I) receives a shock in a downward direction, the results are the following: When the stem (I) descends, the lower end (J) of same closes the conduit (O) and pushes the plunger (E) in a downward direction and while it rotates it offers a resistance in direct relation with the pitch of the helical grooves (B).

As the plunger (E) descends it produces a downward pressure which opens the valves (M) through which the oil flows towards the interior of the cylinder above the plunger, as indicated by the arrows in Fig. 1. In this manner a gradual reduction of the resistance is obtained until the plunger can reach the lower part of the cylinder.

We will now consider the opposite to that which we have just described and suppose that a vertical ascending pressure is brought to bear on the stem (I). The stem (I) by means of the lower end (J) lifts the plunger (E) and automatically uncovers the opening (O). The lower end (J) of the plunger (E) and the conduit (O) thus form an automatic valve. The plunger on being lifted encounters the resistance afforded by the helical grooves of the cylinder (always in relation to the pitch of these grooves) and when in movement forms a partial vacuum below and a pressure above its body; this closes the valves (M) assisted by the weight of the valve ball, the oil thus passing from the upper part of the plunger (E) towards the lower part of same through the openings (R), (L) and (O) gradually reducing the resistance offered by the vacuum, together with the pressure and the helical grooves, to the ascent of the plunger. The dashed horizontal lines in Figure 1 indicate the amount of fluid normally in the device and when the piston travels downward, the fluid flows through the conduits provided in the cylinder wall, passes through the ball valve and enters the upper part of the cylinder. When the piston travels upward, the fluid then flows through the bores in the plunger to the bottom part of the cylinder.

In this manner a shock absorber of double effect is obtained, affording the same degree of resistance while ascending or descending and which resistance is easily adjustable when the apparatus is being constructed and is governed by the capacity, the number of valves, number of inlets and depth of the helical grooves.

A great advantage also afforded by this invention and which is worthy of being mentioned is the perfect and complete automatic lubrication of the apparatus which reduces the wear and tear to a minimum.

It should also be noted that this apparatus operates with triple resistance: mechanical, hydraulic and pneumatic and that whilst the mechanical resistance decreases progressively, the hydraulic-pneumatic resistance increases, and all combined give the apparatus a perfect uniformity in action.

As will be seen from the foregoing the regulation of the operation of the apparatus is governed by the following details:

*Degree of inclination of the interior spiral thread.*—This regulates the resistance to violent shocks, principally at the initial point, although its action continues until the end.

*Number of grooves in the interior of the cylinder.*—The greater the number of spiral grooves, the more smooth and more resistant will be the energy of shock absorption, as they present a greater friction surface.

*Depth of the spiral grooves.*—The greater the depth the stronger is the resistance due to the more extensive friction surface.

*Dimensions of the plunger.*—The larger the piston, the greater will be the mass which will present higher resistance in its moments of inertia.

*Dimensions of the base of the plunger.*—An increased base will naturally offer a greater friction surface.

*General dimensions of the apparatus.*—The greater the dimensions, the greater will be, as is evident, the resistance offered.

*Capacity of the valves.*—The capacity of the valves is to be adjusted in the factory; the smaller the exhaust the greater the resistance and vice-versa.

*Quantity of oil.*—This regulates the resistance of the apparatus after the initial movement and until the end of its action. It may be well to mention that this can be easily adjusted at will, even after the apparatus has left the factory.

*Density of the oil.*—This can also be adjusted after manufacture. When a high resistance is required the density of the oil must be increased or vice-versa.

*Quantity of air.*—This also may be regulated after manufacture and without regard to the use of oil, it directly influences a violent action or a slightly increasing pressure, the greater the quantity of air which may be present between the plunger and the oil level.

From the foregoing it will be evident that by means of suitable combinations in the details mentioned, this shock absorber may be constructed to suit any operation, taking into account the duty it has to perform and following the experience taught by practice.

This shock absorber when in operation on motorcars, secured with its base to the axle and with the stem to the "chassis", offers the great advantage that while the springs operate in a normal and smooth manner, they do not alter the resistance of the apparatus, but as the work of the springs increases, this simultaneously increases its degree of resistance. In the event of a very violent shock which is capable of completely compressing the springs to the extent that the axle will give a strong shock to the chassis, the resistance offered by the compression is so great that the apparatus, possibly, will hardly move, resulting in the chassis receiving the shock in all its intensity.

Having thus ascertained the nature of my invention, what I claim as new and desire to secure by Letters Patent, is:

1. A shock absorber comprising a cylinder containing a fluid, a piston in said cylinder, means to impart to said piston a vertically reciprocating and rotary movement, said piston having a bore in its lower portion, a plunger connected to said piston, the cylinder wall being supplied with conduits through which the fluid flows to the upper part of the cylinder in the downward movement of the piston, valves for controlling the flow of the fluid and an automatic valve formed in the lower part of the plunger and piston to create a compression or pressure below said piston during the downward movement of same and a partial vacuum above the piston or vice versa when the piston travels upwards in order to operate the valves and allow the fluid to flow back through the bore to the lower part of the cylinder in order to gradually reduce the partial vacuum beneath the piston and the compression above same.

2. A shock absorber comprising a cylinder adapted to be attached to the axle of a car and containing a fluid and having longitudinally extending channels in its wall, and helical grooves formed at the inner wall thereof, a piston having helical grooves formed in its outer wall to mesh with the grooves in said cylinder wall, said piston also having a depression in its upper part and a longitudinally extending central bore in its lower part, a plunger adapted to be attached to the axle of a car and having a substantially T-shaped head engaged in the depression of said piston to engage below shoulders formed in said depression, a threaded sleeve surrounding said plunger in the depression of said piston valves controlling the channels in said cylinder wall, and an automatically operating valve formed by said plunger and sleeve having vertical and circular grooves to control said valves for creating a vacuum below said piston upon the lifting of said plunger by a shock partly absorbed by the interengaging helical grooves, said vacuum and the fluid passing below said piston.

3. In a mechanically hydraulically and pneumatically operating shock absorber, a cylinder containing a fluid, a piston in said cylinder composed of a plurality of segments spaced from one another, elastic bodies interposed in the spaces between the segments, and a plunger combined with said piston and providing an automatic valve for creating a vacuum below said piston.

RAMÓN BARROS.